United States Patent [19]

Hardie et al.

[11] Patent Number: 4,901,275
[45] Date of Patent: Feb. 13, 1990

[54] ANALOG DATA ACQUISITION APPARATUS AND METHOD PROVIDED WITH ELECTRO-OPTICAL ISOLATION

[75] Inventors: Ian Hardie; David Vine, both of West Lothian, Scotland

[73] Assignee: Burr-Brown Limited, Livingston, Scotland

[21] Appl. No.: 93,253

[22] Filed: Sep. 4, 1987

[30] Foreign Application Priority Data

Dec. 18, 1986 [GB] United Kingdom ............... 8630260

[51] Int. Cl.⁴ .............................................. G06F 3/05
[52] U.S. Cl. .................................... 364/900; 364/926; 364/927.94; 364/935.46; 364/965.9
[58] Field of Search ... 364/200 MS File, 900 MS File, 364/485, 486, 487; 324/78 D, 79 D

[56] References Cited

U.S. PATENT DOCUMENTS

| | | | |
|---|---|---|---|
| 4,355,445 | 6/1982 | Mercessian | 364/900 |
| 4,435,677 | 3/1984 | Thomas | 323/235 |
| 4,525,741 | 6/1985 | Chahal et al. | 358/212 |
| 4,586,150 | 4/1986 | Budziak et al. | 364/562 |
| 4,740,744 | 4/1988 | Lubarsky et al. | 324/78 D |
| 4,740,966 | 4/1988 | Goad | 328/104 X |
| 4,764,760 | 8/1988 | Bedard et al. | 340/680 |
| 4,817,006 | 3/1989 | Lewis | 364/476 |

*Primary Examiner*—Raulfe B. Zache
*Assistant Examiner*—Florin Munteanu-R.
*Attorney, Agent, or Firm*—Victor Flores; Harry M. Weiss

[57] ABSTRACT

A unit for providing an interface between analog input signals and a digital data processing system bus includes a plurality of analog input channels, sample-and-hold circuits, and an analog-to-digital converter. An optical isolation circuit couples the output of the analog-to-digital converter to a dual-port RAM. The gain of each analog input channel is programmable, as is the address of each input channel in the RAM. Thus the channels can be read in any desired order, and different input voltage ranges can be programmed for each channel. The RAM can be read by an external data processing system via a digital system bus.

2 Claims, 4 Drawing Sheets

FIG. 2

| | | |
|---|---|---|
| CONTROL | REG 2 | 127 |
| CONTROL | REG 1 | 126 |
| CONTROL XXX | REG 3 CONTROL | 125 |
| CONTROL XXX | REG 4 TIMER | 124 |
| XXX | | 100 |
| DIG O/P | | 98 |
| DIG I/P | | 96 |
| CHAN/GAIN (63) | CHAN/GAIN (62) | 95 |
| CHAN/GAIN (1) | CHAN/GAIN (0) | 64 |
| CHANNEL DATA (63) | | 63 |
| CHANNEL DATA (62) | | 62 |
| CHANNEL DATA (3) | | 2 |
| CHANNEL DATA (1) | | 1 |
| CHANNEL DATA (0) | | |

- CONTROL
- SPARE
- DIGITAL I/O
- SCAN LIST
- CHANNEL DATA

ANALOG DATA ACQUISITION APPARATUS AND METHOD PROVIDED WITH ELECTRO-OPTICAL ISOLATION

BACKGROUND OF THE INVENTION

1. Field of the Invention

This invention relates generally to interface apparatus for monitoring a plurality of analog input signals and for applying corresponding digitized signals to a digital system bus and, more particularly, to apparatus and method for providing electrooptical isolation of the analog input signals from the digital system bus. The invention also provides circuitry for enabling the analog input signals to be scanned in any desired order. In addition, a gain setting for each analog input is programmable.

2. Description of the Related Art

It is known in the related art to provide an interface unit to process analog input signals and to apply a digitized version of the analog input signals to a digital system bus.

However, the known prior art systems have been so constructed that the digital system bus has been physically coupled to the analog input channels, and this has often given rise to detrimental performance.

Moreover, known prior art systems have required that the gain setting for the analog input channels be set by manual adjustment of variable potentiometer, strap option, or the like, with the result that such gain adjustment has generally been time-consuming and inflexible.

In addition, prior art systems have lacked any mechanism for quickly and reliably setting the order in which a plurality of analog input channels will be read by the interface system.

There has therefore existed an urgent need for an interface between analog input signals and a digital data processing unit system bus that permits the analog input channels to be electrically isolated from the digital system bus and associated host data processing system. There has also existed an urgent need for an interface unit in which the gain for each analog input channel and the order in which such channels are read can be quickly adjusted.

SUMMARY OF THE INVENTION

It is therefore an object of the present invention to provide an improved interface unit between analog input signals and a digital system bus.

It is also an object of the present invention to provide an interface unit in which analog input signals are digitized and stored in a memory for subsequent retrieval by a data processing unit coupled via a digital system bus to the memory.

It is yet another object of the present invention to provide an interface unit in which analog input channels are optically isolated from a digital system bus.

It is an additional object of the present invention to provide an interface unit in which the gain of each of a plurality of analog input channels can be programmed from a data processing unit via a digital system bus.

It is a further object of the present invention to provide an interface unit in which the order in which a plurality of analog input channels are read can be programed from a data processing unit via a digital system bus.

These and other objects are accomplished in accordance with a preferred embodiment of the invention by providing a unit for interfacing between analog input signals and a digital bus comprising digitizing means for digitizing a selected analog input signal into a digitized signal; memory means; and means for optically coupling the digitized signal to the memory means for storage therein.

BRIEF DESCRIPTION OF THE DRAWINGS

The invention is pointed out with particularity in the appended claims. However, other features of the invention will become more apparent and the invention will be best understood by referring the following detailed description in conjunction with the accompanying drawings in which:

DESCRIPTION OF THE PREFERRED EMBODIMENT

Figure 1:
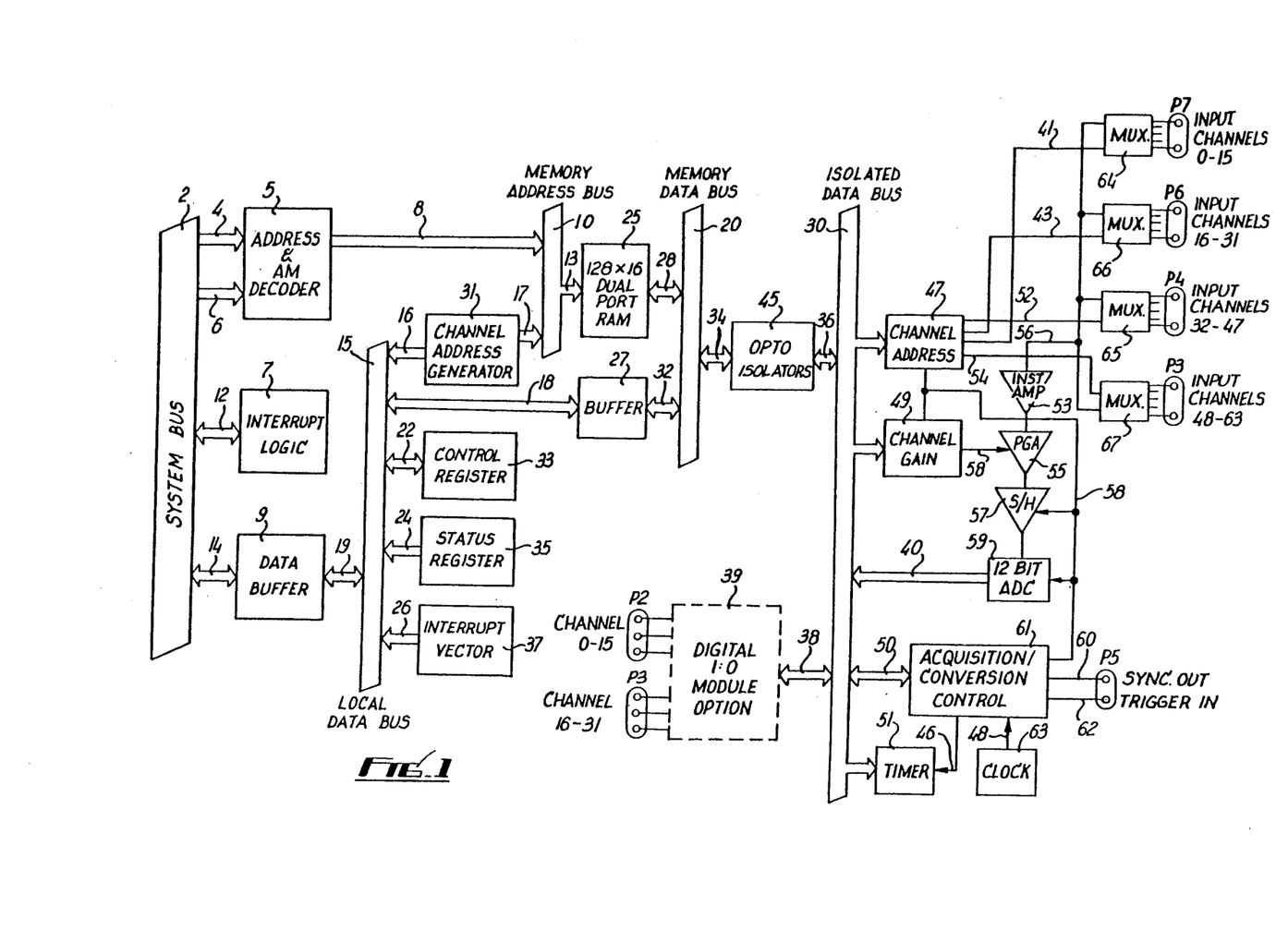
FIG. 1 represents a detailed block diagram of a data acquisition system incorporating the present invention.

With reference to FIG. 1, a detailed block diagram of a data acquisition system incorporating the present invention is shown. A first multiplexer 64 receives as inputs thereto analog input channels 0-15, a second multiplexer 66 receives analog input channels 16-31 a third multiplexer 65 receives analog input channels 32-47, and a fourth multiplexer 67 receives analog input channels 48-63. Input channels 0-15 are associated with a connector designated by P7, input channels 16-31 are associated with a connector designated by P6, input channels 32-47 are associated with a connector designated by P4, and input channels 48-63 are associated with a connector designated by P3. The present invention thus comprises a total of 64 single-ended input channels or 32 differential input channels.

Multiplexers 64, 66, 65 and 67 are coupled to instrumentation amplifier 53 via conductor 56. The output of the instrumentation amplifier 53 is applied as an input to the programmable gain amplifier 55, which also receives a control input over conductor 58 from channel gain circuit 49. Channel gain circuit 49 is coupled to isolated data bus 30.

The output of the programmable gain amplifier 55 is coupled to sample-and-hold circuit 57. The output of sample-and-hold circuit 57 is coupled to 12-bit analog-to-digital converter 59, whose output bus 40 is coupled to isolated data bus 30.

Multiplexers 64, 66, 65 and 67 are controlled by channel address logic 47 via conductors 41, 43, 52 and 54, respectively. Channel address logic 47 is coupled to the isolated data bus 30.

An acquisition/conversion control circuit 61 is coupled to the isolated data bus 30 via bidirectional bus segment 50, to timer 51 via conductor 46, to clock 63 via conductor 48, to a SYNC OUT output terminal via conductor 60, and to the TRIGGER IN input terminal via conductor 62, connector P5 is associated with conductors 60 and 62. Timer 51 is also coupled to isolated data bus 30.

Acquisition/conversion control circuit 61 generates appropriate control signals via conductor 58 to the analog-to-digital converter 59, sample-and-hold circuit 57, channel gain circuit 49, and to channel address logic 47.

Isolated data bus 30 is so named because it is physically isolated from the digital busses and logic circuitry located in FIG. 1 to the left-hand side of opto-isolators 45.

A 32-channel digital I/O module 39 (shown in dashed lines) may optionally be coupled via bidirectional bus segment 38 to isolated data bus 30. Connector P2 is associated with channels 0–15 and connector P3 is associated with channels 16–31 for the digital I/O module 39.

Still referring to FIG. 1, a system bus 2 is shown in the far left-hand side thereof. System bus 2 is a VME bus in a preferred embodiment of the invention, and it couples the interface unit of FIG. 1 to an appropriate data processing system (not shown).

An address and address modification decoder 5 is coupled to system bus 2 via bus segments 4 and 6 and generates address signals via bus 8 to memory address bus 10. Interrupt logic 7 is coupled to system bus 2 via bidirectional bus segment 12.

The address and address modification decoder 5 and interrupt logic 7 provide various addressing and control functions for the interface unit. For example, a bit in the control register 33 selects operation in either continuous or transient modes. When transient mode is selected, conversions stop once the scan address pointer 161 has completed its scan of the scan list 165 (refer to FIG. 5). In continuous mode, conversions are carried out continuously as triggered by either of three possible trigger sources: (1) an external TRIGGER IN on conductor 62; (2) a programmable timer; or (3) a software trigger following a read from any channel data memory location.

Data buffer 9 is coupled to system bus 2 via bidirectional bus segment 14. Data buffer 9 is also coupled via bidirectional bus segment 19 to local data bus 15.

Also coupled to local data bus 15 are channel address generator 31 via bidirectional bus segment 16, data buffer 27 via bidirectional bus segment 18, control register 33 via bidirectional bus segment 22, status register 35 via bus segment 24, and interrupt vector logic 37 via bus segment 26. Data buffer 27 serves to isolate local data bus 15 and memory data bus 20 from circuit noise in addition to regenerating data being processed via bidirectional bus segments 18 and 32.

Channel address generator 31 is coupled to memory address bus 10 via bus segment 17. Memory address bus 10 is coupled to a dual-port random access memory (RAM) 25 via bus segment 13, which in a preferred embodiment of the invention is a 128×16 RAM. Dual-port RAM 25 can be accessed either from memory address bus 10 or from memory data bus 20.

Dual-port RAM 25 and data buffer 27 are coupled to memory data bus 20 via bidirectional bus segments 28 and 32, respectively.

Memory data bus 20 is coupled to isolated data bus 30 by means of opto-isolators 45 and bidirectional bus segments 34 and 36.

Figure 2:
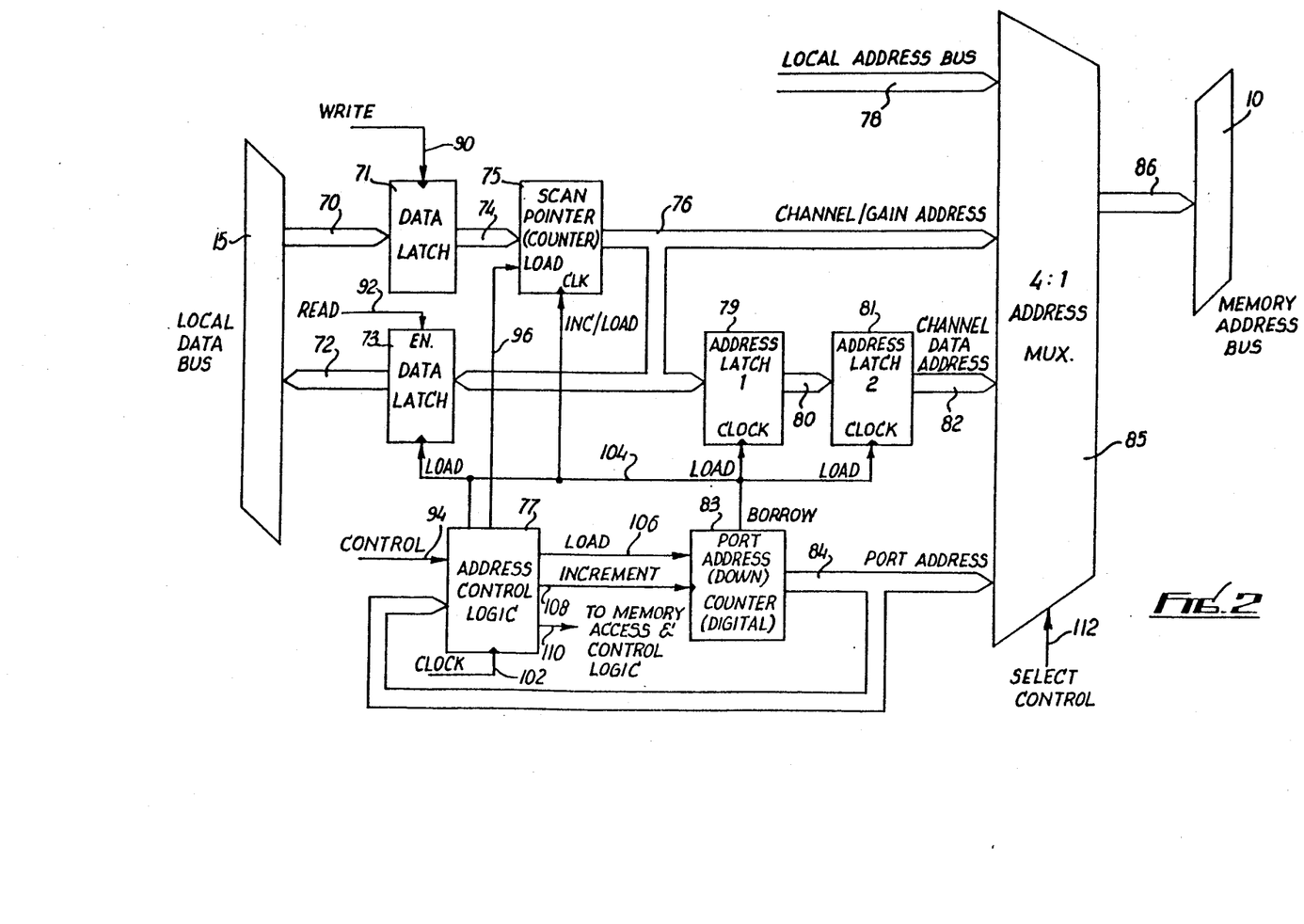
FIG. 2 represents a detailed block diagram illustrating the channel address generator of a preferred embodiment of the interface unit of the present invention.

With reference to FIG. 2, a detailed block diagram illustrates the channel address generator of a preferred embodiment of the interface unit of the present invention.

Local data bus 15 (also shown by the same reference numeral in FIG. 1) transmits data via bus segment 70 to data latch 71 and receives data from data latch 73 via bus segment 72. Data latch 71 transmits data via bus segment 74 to scan pointer counter 75 in response to a write strobe received over conductor 90. Data latch 73 reads data input to it via bus 76 in response to a read strobe received over conductor 92 and to a load signal received over conductor 104.

Scan pointer counter 75 is responsive to a load signal received via conductor 96 and to an increment/load signal received over conductor 104, and it generates signals over channel/gain address 76.

Address latch 79 is coupled to bus 76 and conductor 104 and generates an output via bus segment 80 to address latch 81. Address latch 81 is also coupled to conductor 104, and it generates an output via channel data address bus segment 82 to a 4:1 address multiplexer (MUX) 85.

The address MUX is also responsive to local address bus 78, to channel/gain address bus 76, to a port address bus 84, and to a select control signal via conductor 112.

Address control logic 77 receives address inputs via the port address bus 84. It also receives a clock input via conductor 102 and a control input via conductor 94. It generates a load signal on conductor 106, and an increment signal on conductor 108, both of which are coupled to port address down counter 83. Address control logic 77 also generates an appropriate output signal via conductor 110 to memory access and control logic.

Port address down counter 83 generates an output signal over conductor 104. It also generates an output over port address bus 84.

Address MUX 85 generates an output over bus 86 to memory address bus 10.

The function of the channel address generator circuitry shown in FIG. 2 is to provide RAM addressing capability in order that data may be transferred between RAM 25 and the serial data link through the opto-isolators 45. The serial data link relates to the circuitry illustrated in FIG. 3 between memory data bus 20 and isolated data bus 30 where parallel data in shift registers 121 and 125 is simultaneously transferred from one shift register to the other in serial fashion by synchronized operation of transfer control logic 117, 145 and opto-isolators 45 of FIG. 1. The serial data link circuitry enables optical isolation utilizing a minimal number of opto-isolators.

The channel address generator continually updates the contents of the relevant sections of RAM 25 from the data transferred over the serial link from the analog and digital I/O ports. Digital outputs and control/timer data must also be accessed from RAM 25 and transferred over the serial link to the correct locations in the isolated section of the interface.

The two address latches 79 and 81 serve to delay the appearance of the channel/gain address on bus 76 with respect to the channel data address on bus 82, in order to compensate for the pipelined data acquisition/conversion process which occurs on the isolated section—i.e., after a particular scan address location has been accessed and the channel/gain byte has been written to the serial link, two more such transfers will occur before the converted data from the original channel/- gain channel is written to the correct location in RAM 25. Thus a queue is necessary in the form of address latches 79 and 81.

Figure 3:
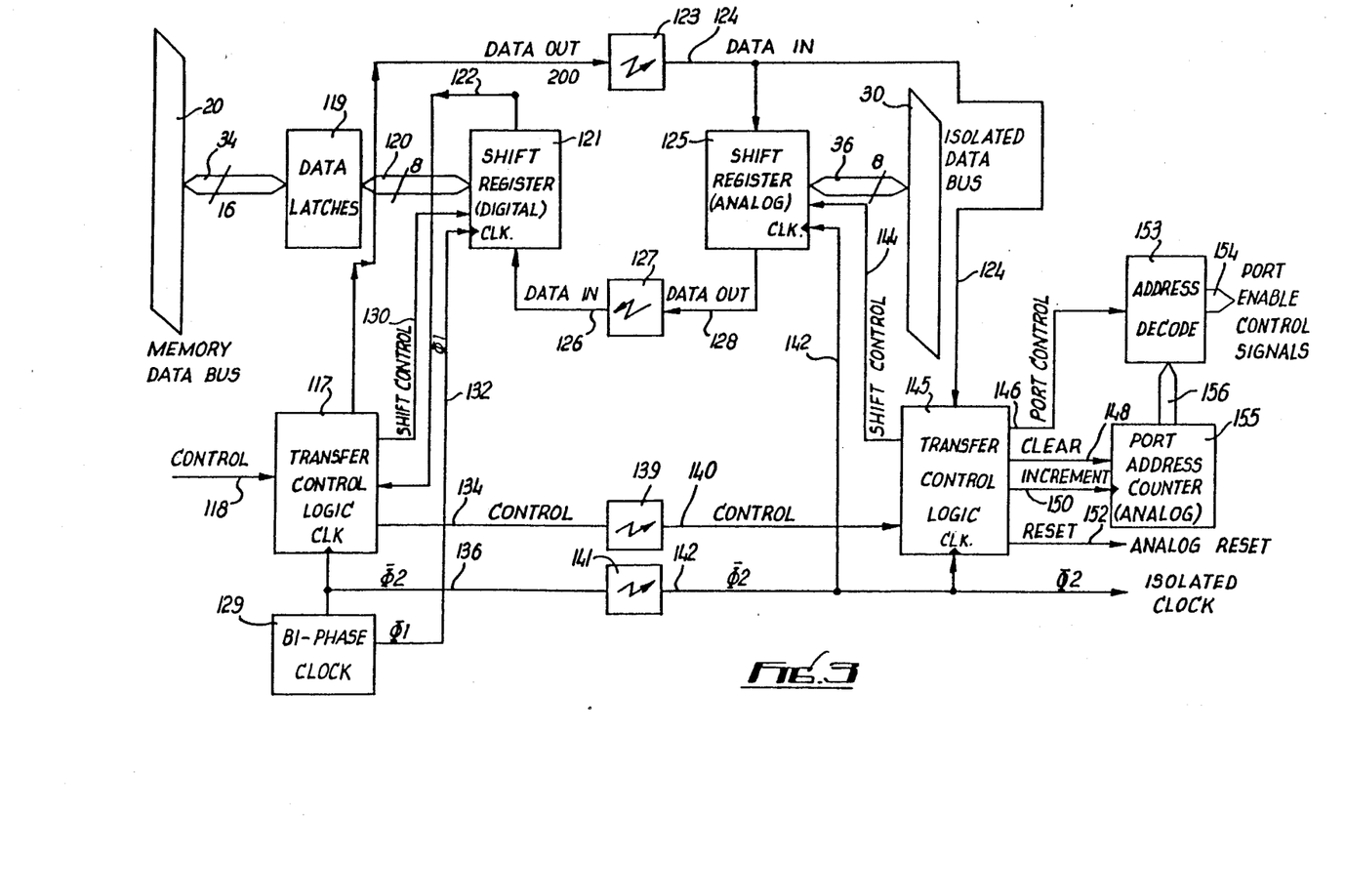
FIG. 3 represents a detailed block diagram illustrating the electro-optical synchronous serial link of a preferred embodiment of the interface unit of the present invention.

With reference to FIG. 3, a detailed block diagram illustrates the electro-optical synchronous serial link of a preferred embodiment of the interface unit of the present invention.

Memory data bus 20 (also shown by the same reference numeral in FIG. 1) is coupled via 16-bit bidirectional bus segment 34 to data latches 119, which are in turn coupled via 8-bit bidirectional bus 120 to shift register 121.

Transfer control logic 117 receives a control input via conductor 118 and a Φ2 clock input from bi-phase clock 129 via conductor 136, and it generates a shift control signal over conductor 130 to shift register 121, as well as a control signal over conductor 134 to opto-isolator circuit 139. Bi-phase clock 129 also generates a Φ1 clock signal via conductor 132 to shift register 121. The Φ2 clock signal is also coupled via conductor 136 to opto-isolator 141.

Shift register 121 receives DATA from opto-isolator 127 via conductor 126, and it transmits DATA to transfer control logic 117 via conductor 122. Transfer control logic 117 provides data for opto-coupler 123 via conductor 200.

The DATA received by opto-isolator 123 is transmitted over conductor 124 to shift register 125 and to transfer control logic 145. Shift register 125 also generates DATA via conductor 128 to opto-isolator 127, which transmits same in the form DATA on conductor 126. Shift register 125 is coupled via 8-bit bus 36 to isolated data bus 30 (indicated by the same reference numeral in FIG. 1).

Opto-isolator 139 retransmits the control signal received via conductor 134 in the form of a control signal on conductor 140 to transfer control logic 145. Likewise, opto-isolator 141 retransmits the Φ2 clock received via conductor 136 as the Φ2 clock on conductor 142 to transfer control logic 145.

Transfer control logic 145 generates a shift control signal via conductor 144 to shift register 125, a port control signal via conductor 146 to address decode circuit 153, a clear signal via conductor 148 to port address counter 155, an increment signal via conductor 150 to port address counter 155 and an analog RESET signal on conductor 152.

Address decode circuit 153 receives input signals from port address counter 155 via bus 156, and it generates port enable control signals over bus 154.

Regarding the operation of the serial link circuitry shown in FIG. 3, data from memory data bus 20 and isolated data bus 30 is respectively transferred bytewide to a pair of shift registers 121 and 125, one on each side of the opto-isolators. Once data is parallel loaded into each shift register, it is then clocked across to the other shift register in serial fashion. Simultaneous bidirectional transfer is performed at the clock rate upon shift registers 121 and 125 receiving their respective shift control signals on conductors 130 and 144.

A bi-phase clock 129 is required to compensate for the wide variation in propagation delay through the opto-isolators. The shift operation is controlled by the transfer control logic 117, which also sends a single control signal via conductor 134 across opto-isolator 13 to the transfer control logic 145.

The function of the transfer control logic 145 is to control reconstruction of port addresses. That is, the port address counter 155 is incremented following a transfer once the data transferred has been written to the current port address. The incremented address is used to access the next port in sequence whose contents are loaded into the shift register for the next transfer.

The states of control line 140 and DATA IN line 124 determine whether the port address counter 155 is incremented or cleared. Port address counter 155 is always cleared at the beginning of each refresh cycle to ensure that noise corruption does not permanently leave the addresses out of sync. A refresh cycle consists of a READ/WRITE to all ports on the isolation section and a complete refresh of seven I/O ports occurs during a single data acquisition/conversion period. The actual refresh cycle time depends upon any memory access contention with host access on the system bus 2.

Figure 4:
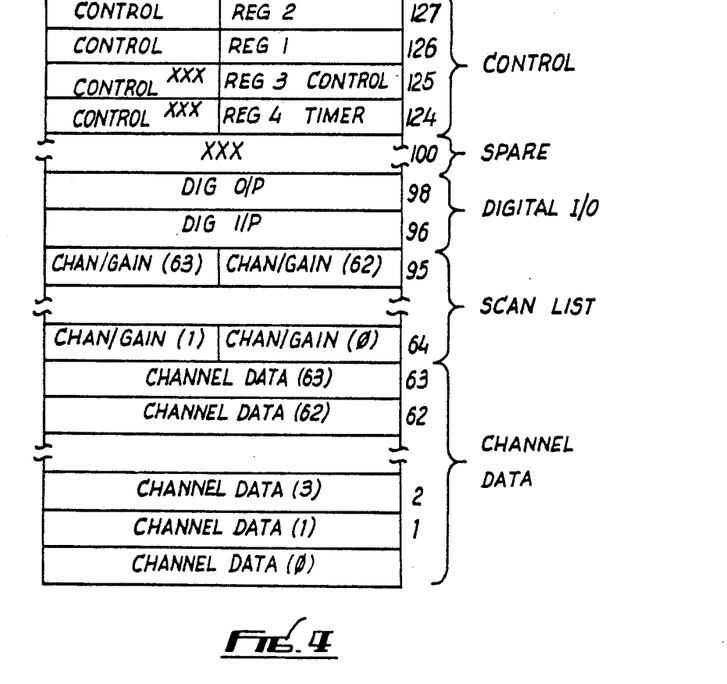
FIG. 4 represents a memory map of the data acquisition system of a preferred embodiment of the present invention.

With reference to FIG. 4, a memory map of the data acquisition system to a preferred embodiment of the present invention is shown. The RAM 25 is a 128×16 bit memory. Word locations 0–63 are allocated to storage of digitized signals.

The thirty-two locations contained between 64–95 represent the scan list. Each location stores two 8-bit bytes, and each byte contains 6 bits indicative of the relative position of the associated input channel in relation to all of the other input channels. The remaining 2 bits of each byte store gain information which is used to adjust the gain of the associated input channel.

Locations 96–99 store digital input/output information. All digital I/O is mapped to this four-word block of memory. Locations 100-123 are presently unused. An 8-bit byte of location 124 is used to store timer information, and an 8-bit byte of 125 stores triggering control information. An 8-bit byte of location 126 and 127 is used to store control information. The timer and control information are modifiable by the host processor via the system bus 2.

Figure 5:
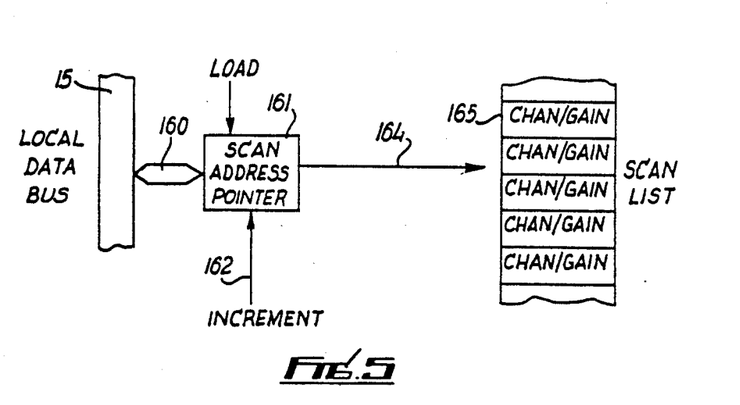
FIG. 5 represents a block diagram illustrating how the scan list is accessed in a preferred embodiment of the present invention.

With reference now to FIG. 5, a block diagram illustrates how the scan list is accessed in a preferred embodiment of the present invention.

The scan address pointer 161, implemented as a 6-bit counter, is coupled via bidirectional bus 160 to local data bus 15, and to an increment input over conductor 162. It is incremented upon the completion of each analog-to-digital conversion. It points to the scan list 165 and determines which channel is currently being addressed. The scan address pointer register 161 can be read or written at any time from the host processor via the system bus 2. The scan address pointer will be preset to the contents of local data bus 15 by a load signal on conductor 201.

OPERATION OF PREFERRED EMBODIMENT

In operation, the interface unit shown in FIG. 1 captures analog data at channels 0–63, amplifies it, holds it temporarily, then digitizes it, transmits it serially through the optoisolator circuit, and stores it in the appropriate word location in RAM 25 for access by a host processor via system bus 2.

The channel gain for each analog input channel is individually adjustable by programmable gain amplifier 55 according to the gain information stored in Ram 25 and transferred onto bus 30 for the particular input channel that is being scanned. In addition, the order in which individual input channels are sampled is adjustable.

The scan list, comprising word locations 64–95 of RAM 25 (refer to FIG. 4), is first loaded with the desired gain and channel order information. Each word in the scan list comprises two 8-bit bytes. Each byte contains a 6-bit channel address and a 2-bit gain value (e.g. 1, 10, 100). Address 000000 corresponds to channel 0; address 000101 corresponds to channel 5; and so forth.

The scan list is read sequentially. A successive scan list byte is read out upon each incrementation of the scan address pointer 161 (refer to FIG. 5). Any permutation of channels may be programmed to be mapped to the channel data memory locations. Thus the order and frequency of conversions on each channel may be modified as desired.

Any channel may be scanned more frequently than another. The two extremes would be that one channel alone is mapped to all 64 locations in the scan list, thus providing single channel operation, or each channel is mapped to an individual input for a total of 64 channel conversions.

The contents of all locations in RAM 25 may be read or written to at any time.

Since both the scan address pointer 161 and the scan list 165 are programmable, an almost infinite variety of data acquisition sequences is possible.

There are significant advantages to the analog interface herein described. Once significant advantage is a reduction in opto-isolator hardware in the interface unit, thus resulting in a smaller device and reduced cost. Another advantage is a significant improvement in flexibility of operating the interface unit, since the sequence of channel conversions, as well as the gain factor for any channel, can be easily modified at any time. Field programmable logic arrays (FPLA's), and in particular programmable array logic (PAL) devices commercially available from Monolithic Memories, Inc. are used in many of the control logic circuits of the present invention, such as the address control logic 77 and transfer control logic 117.

OPERATION OF THE CONTROL AND STATUS REGISTERS

The system occupies 256 memory locations in the VME bus memory map. The bottom 128 locations map onto on board memory system which holds the scan list data, digital I/O and converter data plus control and timer information. These bottom 128 locations can be accessed with address line A8=0. The top 128 locations map onto an interrupt control and vector register and a scan list register. The interrupt control and interrupt vector may be written to or read from by driving address lines A8 high and A1 low. The contents of the scan list may be "changed on the fly" by a write cycle with address lines A8 high and A1 high.

The interrupt control and vector registers have the following bit definitions:

| INTERRUPT CONTROL | | | | | | | | INTERRUPT VECTOR | |
|---|---|---|---|---|---|---|---|---|---|
| D15 | D14 | D13 | D12 | D11 | D10 | D9 | D8 | D7 | D0 |
| INT ENABLE | SEL2 | SEL1 | SEL0 | C/T | EN2 | EN1 | EN0 | STATUS/ID BYTE | |

CONTROL REGISTER 1

D0–D7—hold the interrupt vector which is supplied during a valid interrupt cycle as defined by the VME bus.

D8–D9—enables the board to develop an interrupt at the occurrence of the following events:

| EN1 | EN0 | FUNCTION |
|---|---|---|
| 0 | 0 | No interrupt |
| 0 | 1 | Interrupt on each conversion |
| 1 | 0 | Interrupt on half full and full |
| 1 | 1 | Interrupt on full only |

D10—enables the system to generate an interrupt whenever the user supplied external trigger oversamples. (D10=1)

D11—configures the system for either continuous (D11=1) or transient (D11=0) operation.

D12-D14—enables the user to supply a software programmable interrupt request level. The combination of these three lines map to the seven request lines as follows:

| SEL2 | SEL1 | SEL0 | INTERRUPT REQUEST LINE DRIVEN DURING A VALID INTERRUPT CYCLE |
|---|---|---|---|
| 0 | 0 | 0 | No interrupt request |
| 0 | 0 | 1 | /IRQ1 driven |
| 0 | 1 | 0 | /IRQ2 driven |
| 0 | 1 | 1 | /IRQ3 driven |
| 1 | 0 | 0 | /IRQ4 driven |
| 1 | 0 | 1 | /IRQ5 driven |
| 1 | 1 | 0 | /IRQ6 driven |
| 1 | 1 | 1 | /IRQ7 driven |

D15—is a global interrupt enable and as such if this bit is set high then no interrupt will be generated. If the bit is low then an interrupt will be generated as determined by the combination of EN2, EN1 and EN0.

If address line A8 is driven high and A1 is low and a read cycle is in progress, then the interrupt control and vector register will be read back.

If address line A8 is high, A1 is high and a write cycle is in progress, then the scan list register will be accessed. This register is mapped as follows: (Note that all bits are indicated as not used because under these conditions, the scan list is being "changed on the fly" and the contents depends on the scan list information being written.)

| | SCAN LIST REGISTER | | | | | | | | |
|---|---|---|---|---|---|---|---|---|---|
| D15 | | D8 | D7 | D6 | D5 | D4 | D3 | D2 | D1 | D0 |
| X | X | X | X | X | X | X | X | X | X | X | X |

CONTROL REGISTER 2

If address line A8 is high, A1 is high and a read cycle is in progress, then the status register and the current scan list status is accessed. This register is mapped via:

| STATUS REGISTER |
|---|

-continued

| D15 | D14 | D13 | D12 | D11 | D10 | D9 | D8 |
|-----|------|-------|--------|--------|-------|-----|----|
| 0 | /Full | /HFull | /OVSAM | /VALID | /BUSY | S/D | X |

| | | | SCAN LIST POINTER | | | | |
|----|----|----|----|----|----|----|----|
| D7 | D6 | D5 | D4 | D3 | D2 | D1 | D0 |
| 0 | 0 | SC5 | SC4 | SC3 | SC2 | SC1 | SC0 |

D0–D5—represent the next channel address/gain location that will be accessed. Note that this only changes after converted data is written into memory.

D8—is unused.

D9—reflects the configuration of the analog front end in that is indicates whether signal ended or differential inputs are being processed.

D10—indicates that conversions are in progress. If the board is configured for transient operation this bit will be set high when the transient capture is complete. Otherwise the bit will be cleared indicating that a conversion cycle is in progress.

D11—is active when valid data has just been written into the system memory. If D11 is 0 then valid data is in memory otherwise no new converted data has been written to memory.

D12—is active when the sampling rate produced by external triggers exceeds the 40KHz maximum. If D12 is "0" then oversampling has occurred.

D13–D14—reflect the status of the number of samples acquired and they become active after the following occurrences:

| /HFULL | /FULL | NUMBER OF SAMPLES WRITTEN INTO MEMORY |
|--------|-------|---------------------------------------|
| 0 | 1 | =32 |
| 1 | 0 | =64 |

SYSTEM /FULL & /HFULL FLAGS

The on board memory holds two control registers. These may be accessed at location $7F(hex) and $7E. The first control register is mapped as follows:

| D15 | D14 | D13 | D12 | D11 | D10 | D9 | D8 | D7 | D6 | D5 | D4 | D3 | D2 | D1 | D0 |
|-----|-----|-----|-----|-----|-----|----|----|----|----|----|----|----|----|-------|-------|
| X | X | X | X | X | X | X | X | X | X | X | X | X | X | EXTEN | TIMEN |

CONTROL REGISTER 3

D0—D1—control the triggering options of the ADC according to the following truth table.

| EXTEN | TIMEN | FUNCTION |
|-------|-------|----------|
| 0 | 0 | Conversions initiated by reading converted data from the on-board memory |
| 0 | 1 | Conversions controlled by on board timer (programmable sampling) |
| 1 | 0 | Conversions initiated by external trigger pulses |
| 1 | 1 | Conversions initiated by single event which starts the on board timer. |

The sample rate produced in internal triggering is dependent on a Jumper J11 and the contents of control register 4 (RAM location $7E.

The jumper block is used to supply a "tick" time to the second software programmable counter. The "tick" time will range from 400 nS to 512 uS in 200 nS increments and used in conjunction with control register 4 yields sampling rates between 25 uS and 13.1 ms.

External Triggering

When control register 3 has EXTEN=1 and TIMEN=0 the system will be configured for external triggering.

In this mode, the user supplies an active low strobe, which must be low for at least 300 nS, to the external trigger input.

An external triggering cycle may be utilized by the following procedure:

(a) Update the scan list so that it reflects the desired input channel sequence.

(b) Write to control register 3 and set EXTEN=1 with TIMEN=0.

(c) Write to control register 2 (the scan list register) so that it will access the correct starting address of the scan list element that holds the start of the desired input sequence.

(d) Write to the control register 1 to configure for interrupt or polling and C/T.

After the scan list register has been accessed, a software reset forces both sides of the system to synchronize and it fills the next channel address pipeline. The delay required to fill the address pipeline is of the order of 50 usecs and as such any external triggers arriving before this time will be ignored.

An analog to digital conversion cycle is initiated when the analog control section observes that the address pipeline is full and an external trigger is applied with EXTEN=1 and TIMEN=0.

The end of each conversion cycle will generate a data valid bit in the status register which enables a polling mode. If interrupts are enabled then the board may generate an interrupt as determined by EN1, EN0 of control register 1.

Internal Triggering

The system may be configured to generate sampling rates that are controlled by a quartz crystal and counter combination. A combination of two counters allow the user to program, by a mixture of hardware and software, a wide dynamic range of sampling intervals.

The repetition rate of the trigger pulses is variable between 25 useconds and 13.1 mseconds.

The internal triggering mode can be configured by the following procedure:

(a) Update the scan list so that it reflects the desired sequence of input channels.

(b) Write to control register 4 to provide the required sampling rate.

(c) Write to control register 3 and configure EXTEN=0 with TIMEN=1.

(d) Write to control register 2 (the scan list register) so that the correct number of samples will be acquired. See Attachment A.

(e) Write to control register 1 to configure the system or board for polling or interrupt driven mode with C/T.

Shortly after step (d), the system undergoes a software reset that synchronizes the analog and the digital sides of the system board. This software reset fills the next channel address pipeline and it is important to note that internal triggering will not commence until the pipeline is full.

The pipeline becomes full approximately 50 usecs after the software reset and consequently the first input sample will not be taken until 50 usecs plus one sample period elapses.

Thereafter the sampling will be periodic with the period defined by the combination of control register 4 and the "tick" interval.

Event Triggering

In this mode, the system will commence sampling at a rate determined by control register 4 and the "tick" interval, as described above, when EXTEN=-TIMEN=1 and an external pulse is applied to the external trigger input. This external trigger should be active low and is designed for TTL level inputs.

The minimum active low time should be 300 nS while the maximum active low time should be 15 usecs.

It is important to note that if the sampling rate exceeds the 25 usecs maximum then the oversampling flag becomes active.

The following procedure will correctly configure the system for event triggering.
(a) Update the scan list so that the scan list elements reflect the desired sequence of input channels, with their corresponding gain settings.
(b) Write to control register 4 to configure the sampling rate.
(c) Write to control register 3 to configure EXTEN=-TIMEN=1.
(d) Write to control register 2 (scan list register) so that the correct number of samples will be acquired.
(e) Write to control register 1 and configure the board for interrupt or polling mode and set up for continuous or transient capture.

Shortly after step (d), the system undergoes a software reset which synchronizes both sides of the system board and also fills the next channel address pipeline. It is important to note that the analog control section will ignore any external triggers until the pipeline is full.

The next channel address pipeline takes 50 usecs to fill and it is only after this time that an external trigger of proper duration, will commence the on-board timer. Consequently a total time of 50 usecs plus one sampling period will elapse before a conversion is initiated.

Interrupt Response

Control Register 1 configures the system or board to respond to certain occurrences by generating an interrupt.

The two bits in control register 1 responsible for interrupt generation as a result of analog to digital conversions are EN0 and EN1.

One further bit has been allocated to allow the system or board to generate an interrupt on oversampling.

It is important to note that once an interrupt has been produced by the system then further interrupts are masked out until re-enabled by specific board accesses.

| | | | |
|---|---|---|---|
| VME BASE ADDRESS + 254 | | CONTROL REG 3 | word location $7F |
| VME BASE ADDRESS + 252 | | CONTROL REG 4 | word location $7E |
| | OUTPUT PORT 3 | OUTPUT PORT 2 | word location $63 |
| | OUTPUT PORT 1 | OUTPUT PORT 0 | word location $62 |
| | INPUT PORT 3 | INPUT PORT 2 | word location $61 |
| | INPUT PORT 1 | INPUT PORT 0 | word location $60 |
| | SCAN LIST 63 | SCAN LIST 62 | word location $5F |
| | SCAN LIST 3 | SCAN LIST 2 | word location $41 |
| | SCAN LIST 1 | SCAN LIST 0 | word location $40 |
| | | CONVERTED DATA WORD 63 | word location $3F |
| | | CONVERTED DATA WORD 62 | word location $3E |
| VME BASE ADDRESS + 6 | | CONVERTED DATA WORD 3 | word location $03 |
| VME BASE ADDRESS + 4 | | CONVERTED DATA WORD 2 | word location $02 |
| VME BASE ADDRESS + 2 | | CONVERTED DATA WORD 1 | word location $01 |
| VME BASE ADDRESS + 0 | | CONVERTED DATA WORD 0 | word location |

| SYSTEM MEMORY MAP | D15 even byte | odd byte D0 | $00 |
|---|---|---|---|

-continued

System Scan List Register Control Register 2

The nominal size of the scan list on the system is 64 elements which may be user configured to reflect any desired sequence of input channels.

To increase the flexibility of the system a scan list register has been incorporated which offers an in built block size counter. For example, if the user requires 10 samples instead of 64 then this can be accomplished in the following manner:

(a) configure the on-board memory between word locations 5BH and 5FH to reflect the desired sequence of mux addresses. Note that 5 word locations contain 10 scan list elements. The mux information is contained in 6 bits with two further bits required by the gain information. Consequently, a 16 bit word can hold two sets of mux/gain information.

(b) Write to the scan list register and set it to 36H. The act of writing to the scan list register invokes a software reset of the system or board. This software reset loads the scan list address generator with the contents of the scan list register.

The first two elements of the scan list, addressed by the scan list address generator, are transferred across the serial link, initializing the next channel address pipeline.

The scan list address generator is incremented at the end of each conversion when the end of conversion is sensed high.

Since the scan list address generator has been preset to 36H, converted data appears in memory locations 36H to 3FH. If the scan list register contained 30H then converted data would appear in locations 30H to 3FH. Consequently the scan list register offers the user a software programmable block size.

System Triggering Modes

A conversion cycle on the system may be initiated by one of three sources. These sources are:
(a) Software
(b) On board timer
(c) External Trigger Which of these three sources triggers the ADC is controlled by two bits in control register 3, located at the top of on board memory. The truth table is as follows:

| TIMEN | EXTEN | FUNCTION |
|---|---|---|
| 0 | 0 | Software Trigger |
| 0 | 1 | External Trigger |
| 1 | 0 | On board Timer |
| 1 | 1 | Event Triggering |

Software Triggering

When control register 3 has TIMEN=EXTEN=0 the system will be configured for software triggering.

This mode may be correctly programmed by adhering to the following procedure:
(a) Update the scan list so that it reflects the desired input channel sequence.
(b) Write to control register 3 and set EXTEN=TIMEN=0.
(c) Write to the scan list register so that it reflects the correct starting address of the desired input sequence. For example, if in step (a), memory locations 50H-5FH were loaded with the desired input sequence then the scan list register should be loaded with 50H.
(d) Write to control register 1 to configure for interrupt/polling or C/T. The action of writing to the scan list register invokes a software reset which synchronizes the isolated and unisolated sections of the system. This software reset ensures that the next channel address pipeline is filled and consequently the CPU should not initiate a software trigger until 50 usecs after step (c) above.

The software triggering can then commence by having the CPU make a dummy read from the converted data ram locations. The data obtained from this read cycle should be discarded. At the end of this read cycle a software trigger is generated which initiates a conversion cycle resulting in converted data being written into memory.

The CPU may poll the status register or it may configure the system to interrupt on the event of end of conversion.

What is claimed is:

1. A data acquisition interface unit for processing a plurality of analog data input signals for use by an external digital data processing system comprising:
(a) circuit means for selecting, setting a gain on and digitizing a selected one of said plurality of analog input signals, said circuit means including:
  (i) multi-channel multiplexer means comprising 0–63 input channels for receiving said plurality of analog data input signals,
  (ii) channel address logic circuit means coupled to said multi-channel multiplexer means for enabling selection of a particular analog signal to be processed,
  (iii) channel gain circuit coupled to a programmable gain amplifier for enabling said setting a gain on said particular analog signal to be processed, said programmable gain amplifier also being coupled to said multi-channel multiplexer means, and
  (iv) analog-to-digital converter coupled to said programmable gain amplifier via a sample-and-hold circuit, said analog-to-digital converter digitizing said particular analog signal to be processed;
(b) parallel-to-serial-to-parallel optical coupling circuitry means coupled to said circuit means for processing said digitized analog signal;
(c) memory means coupled to said parallel-to-serial-to-parallel optical coupling means for storing said processed digital signal, said memory means also storing a channel scan list consisting of channel order information relating to selection of said 0–63 input channels to be processed and gain information relating to a gain to be applied on analog signals received on said 0–63 input channels prior to being digitized;
input/output data bus means coupled to said memory means for coupling said interface unit to said external data processing system; and local data bus coupled to said input/output data bus means and to said memory means for receiving and transferring interrupt, status, channel address, and control information generated by interrupt vector logic, status register, channel address generator and control register circuitry, respectively, to said memory means via a memory address bus and to said circuit means via a memory data bus coupled to said parallel-to-serial-to-parallel optical coupling means.

2. A method of interfacing an analog input data signal to a digital data processing unit, said method comprising the steps of:
(a) providing a data acquisition interface unit, said unit comprising:
   (i) circuit means for selecting, setting a gain on, and digitizing a, selected one of a plurality of analog input signals, said circuit means including:
      multi-channel multiplexer means comprising 0-63 input channels for receiving said plurality of analog data input signals,
      channel address logic circuit means coupled to said multi-channel multiplexer means for enabling selection of a particular analog signal to be processed,
      channel gain circuit coupled to a programmable gain amplifier for enabling said setting a gain on said particular analog signal to be processed, said programmable gain amplifier also being coupled to said multi-channel multiplexer means, and
      analog-to-digital converter coupled to said programmable gain amplifier via a sample-and-hold circuit, said analog-to-digital converter digitizing said particular analog signal to be processed,
   (ii) parallel-to-serial-to-parallel, optical coupling circuitry means coupled to said circuit means for processing said digitized analog signals,
   (iii) memory means coupled to said parallel-to-serial-to-parallel optical coupling means for storing digital data including a processed digital signal, control data, channel scan and gain information, said channel scan information consisting of channel order information relating to selection of said 0-63 input channels to be processed and said gain information relating to a gain to be applied on analog signals received on said 0-63 input channels prior to being digitized,
   (iv) system input/output data bus means coupled to said memory means for coupling said interface unit to said external data processing system and communicating digital information, and
   (v) local data bus coupled to said input/output data bus means and to said memory means for receiving and transferring interrupt, status, channel address, and control information generated by interrupt vector logic, status register, channel address generator and control register circuitry, respectively, to said memory means via a memory address bus and to said circuit means via a memory data bus coupled to said parallel-to-serial-to-parallel optical coupling means;
(b) accessing said channel scan and said gain information for selecting and setting a gain on a particular one of said plurality of input analog data signals received on said 0-63 input channels;
(c) digitizing said selected one analog data signal using said analog-to-digital converter;
(d) processing said digitized analog data signal via said optical coupling circuitry means;
(e) mapping and storing said processed digitized analog data signal to said memory means;
(f) performing I/O data communications through said system input/output data bus means, including transferring said stored digitized analog data signal; and
(g) controlling input channel address/gain selection via said local data bus and said system input/output data bus means.

* * * * *